United States Patent
Hedgecock

(10) Patent No.: US 10,534,777 B2
(45) Date of Patent: Jan. 14, 2020

(54) SYSTEMS AND METHODS FOR CONTINUOUSLY DETECTING AND IDENTIFYING SONGS IN A CONTINUOUS AUDIO STREAM

(71) Applicant: CDX Nashville, LLC, Nashville, TN (US)

(72) Inventor: Will Hedgecock, Nashville, TN (US)

(73) Assignee: CDX Nashville, LLC, Nashville, TN (US)

( * ) Notice: Subject to any disclaimer, the term of this patent is extended or adjusted under 35 U.S.C. 154(b) by 756 days.

(21) Appl. No.: 15/067,049

(22) Filed: Mar. 10, 2016

(65) Prior Publication Data

US 2017/0024441 A1    Jan. 26, 2017

Related U.S. Application Data

(60) Provisional application No. 62/131,224, filed on Mar. 10, 2015.

(51) Int. Cl.
| | |
|---|---|
| G06F 7/00 | (2006.01) |
| G06F 16/2455 | (2019.01) |
| H04H 60/48 | (2008.01) |
| H04H 60/82 | (2008.01) |
| G06F 16/683 | (2019.01) |
| H04H 60/58 | (2008.01) |
| G10L 25/54 | (2013.01) |
| H04H 20/14 | (2008.01) |
| H04H 20/82 | (2008.01) |

(52) U.S. Cl.
CPC ...... *G06F 16/24568* (2019.01); *G06F 16/683* (2019.01); *G10L 25/54* (2013.01); *H04H 60/48* (2013.01); *H04H 60/58* (2013.01); *H04H 60/82* (2013.01); *G06F 2221/0733* (2013.01); *H04H 20/14* (2013.01); *H04H 20/82* (2013.01); *H04H 2201/90* (2013.01)

(58) Field of Classification Search
CPC .............................................. G06F 2221/0733
See application file for complete search history.

(56) References Cited

U.S. PATENT DOCUMENTS

| | | | | |
|---|---|---|---|---|
| 2011/0041154 | A1* | 2/2011 | Olson | G06F 16/7834 725/54 |
| 2011/0085781 | A1* | 4/2011 | Olson | H04N 5/782 386/296 |
| 2012/0239690 | A1* | 9/2012 | Asikainen | G06F 16/48 707/770 |
| 2012/0303663 | A1* | 11/2012 | Asikainen | G06F 16/3347 707/780 |

(Continued)

*Primary Examiner* — Eliyah S. Harper
(74) *Attorney, Agent, or Firm* — Mark A. Pitchford; Eric B. Fugett; Pitchford Fugett, PLLC

(57) ABSTRACT

A system and method for detecting songs in a continuous audio stream are disclosed. A detection server segments the continuous audio stream, and analyzes the audio stream to determine song candidates according to various processes disclosed herein. In one embodiment, the candidates are determined to be accurate when temporally ordered fingerprints exceed a predetermined threshold, adjacent audio stream segments are determined to have the same best song candidate, and the determined song detection has not been previously detected in the data stream within a predetermined period of time.

15 Claims, 5 Drawing Sheets

(56) References Cited

U.S. PATENT DOCUMENTS

| | | | | |
|---|---|---|---|---|
| 2014/0310269 A1* | 10/2014 | Zhang | ............... | G06F 16/638 707/725 |
| 2014/0335834 A1* | 11/2014 | Emerson, III | ....... | G06F 16/683 455/414.1 |
| 2015/0302086 A1* | 10/2015 | Roberts | ............. | G06F 16/683 707/771 |

* cited by examiner

| Song ID | Temporal ID | Fingerprint |
|---|---|---|
| 1123 | 0 | f03;cd0986fhj21;3klhjd-lf;klhjv-d8ufh.jkelhw-38fhd;klsjf04923jkfj0de9fjs;43 |
| 1123 | 1 | 089432rjklf;sdjfa;klsdfj-04ujrlwjef-du8sfolj432-0r89je;ilwjf9djfkdls;jf;re0984 |
| 1123 | 2 | jrk4l3jf08d9usvjkldjf4039u42;klrj;kljd9dusjf;kalfjkdj234rj4320rj9we;fkljdaf9 |
| 1123 | ... | ... |
| 1123 | 1256 | r32-fkl;kdjh;flk423jr09jkld;js;fj2fe9ivjkcxlkv;paeortui-0394utrj;kljdf;kldjs0a0 |
| 1356 | 0 | 993jr902;jlksjdfkwokjf092j4f;ljsdf-a089jsf;klqj34-ru8a9sdklfju9as;oef-q34ut |
| 1356 | 1 | ojif-34u;kfdlfjg-ig-jq3gi-89sajd;gklqjwer09u3jfjkljf;owfi094jfkljwer09ujpwojt4 |
| ... | ... | ... |

1st song: rows with Song ID 1123
2nd song: rows with Song ID 1356

SYSTEMS AND METHODS FOR CONTINUOUSLY DETECTING AND IDENTIFYING SONGS IN A CONTINUOUS AUDIO STREAM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to U.S. Provisional Patent Application No. 62/131,224 entitled "SYSTEMS AND METHODS FOR CONTINUOUSLY DETECTING AND IDENTIFYING SONGS IN A CONTINUOUS AUDIO STREAM" filed on Mar. 10, 2015.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Audio fingerprinting and song recognition technologies offer the ability to recognize a song from a user defined audio clip, usually 30 seconds long or less. A smartphone equipped with this technology (e.g., Shazam, SoundHound, or Gracenote) can quickly identify an unknown song playing on the radio when the user defines an audio clip for the smartphone. Similar services can scan a music library (i.e., a collection of files, each file representative of a song) on a computer to correct metadata associated with each file and detect duplicate songs.

While useful for identifying user-defined audio clips, these systems depend on a user definition of a sound clip (i.e., user input instructing the system to start analysis of an ongoing audio clip or existing audio files stored in a predetermined location like a music library), and they cannot operate without oversight. The detection accuracy is generally less than 90%, and they cannot operate continuously and on the fly to pick songs out of an audio stream including sounds other than a song (e.g., a live show or a radio station broadcast) such as speech.

In other words, one limitation of existing techniques is that they simply record only a short segment of audio, carry out a fingerprinting algorithm on this audio clip or segment, and attempt to match that fingerprint to an existing database of audio fingerprints. These systems have difficulty distinguishing between various versions of the same song (including different recordings, recording artists, song edits and cuts, etc.); lack robustness with noisy audio signals; identify incorrect songs when multiple songs have very similar audio characteristics (key, tempo, instruments, rhythm, etc.); and are unable to detect song endings and beginnings, or in other words, to detect song boundaries within a continuous audio stream.

When trying to detect songs within a plurality of continuous audio streams, a single computer, server, or virtual machine will often exceed the memory capacity and/or allocation of the machine upon which the detection system is operating. Additionally, if too many streams are aggregated at a single data center, then temporal disruption will occur and/or streams will be dropped altogether affecting the ability to monitor and detect songs in continuous audio streams, and the performance of other latency dependent services at the data center will be compromised.

BRIEF SUMMARY OF THE INVENTION

In one aspect of the invention, a real-time, cloud-based audio detection service monitors continuous Internet-based audio streams. In one embodiment, it enables detection of radio airplay spins on terrestrial radio stations by monitoring (i.e., listening to) each monitored station's Internet stream. The system is transparent to the radio stations themselves. No special equipment or setup is required for a station's airplay to be monitored, so long as that airplay is available via a public-facing Internet audio stream, as most radio streams are. If the station does not provide an online stream, a local receiver may be set up in proximity to the radio station's antenna in order to receive the radio broadcast from the antenna and stream the received broadcast to the monitoring system. The system generates audio fingerprints from the received streams, but only after segmenting and ordering the samples to allow for audio fingerprinting in a continuous and temporal manner. Segmenting audio, analyzing fingerprints, and ordering fingerprint matches in this way ensures correct song detections, even in the presence of a continuous, possibly noisy signal, and in the case when multiple versions of a song may exist. The system is capable of detecting unauthorized playing of copyrighted songs in live music venues; monitoring radio station playlists for entertainment as well as for record-keeping and data validation purposes; and tracking song spins at currently unmonitored venues such as night clubs and music establishments for the purpose of more accurately and honestly distributing royalties to artists.

In one aspect, a system for detecting and identifying songs in a continuous audio stream includes a fingerprint database and a detection server. The fingerprint database includes acoustic fingerprints wherein each fingerprint is associated with a temp oral value and a song identifier such that the acoustic fingerprints corresponding to a song identifier can be to poorly ordered by the temporal value associated with each fingerprint. The detection service for detecting a song in the data stream. The detection server is configured to receive, via a communications network, a data stream comprising an audio stream. The detection server decodes the audio stream into a pulse code modulated (PCM) stream. The detection server analyzes the PCM stream by accumulating a predetermined length of the PCM stream into a buffer. The detection server generates a plurality of time poorly ordered acoustic fingerprints from the predetermined length of the PCM stream accumulated in the buffer. The detection server compares each acoustic fingerprint of the plurality of time poorly ordered acoustic fingerprints generated from the predetermined length of the PCM stream accumulated in the buffer to the acoustic fingerprints in the fingerprint database to produce matches. The detection server groups matches by song identifier, and adds the song identifier to a list of song candidates if the quantity of matches intergroup exceeds a predetermined threshold and the mashed acoustic fingerprints are in the same temp oral order in the fingerprint database as in the plurality of time poorly ordered acoustic fingerprints generated from the predetermined length of the PCM stream accumulated in the buffer. The detection server determines a song detection if the match, 10 poorly ordered acoustic fingerprints of the group of matches having the greatest quantity of matched acoustic fingerprints exceeds the time threshold.

In another aspect, a method of detecting and identifying songs in a continuous audio stream includes storing a fingerprint database of acoustic fingerprints. Each fingerprint is associated with a temp oral value in a song identifier such that the acoustic fingerprints corresponding to a song ended the fire can be 10 poorly ordered by the temporal value associated with each acoustic fingerprint. The method also includes detecting, via a detection server, a song in a data stream. Detecting comprises receiving, decoding, and analyzing. The detection server receives via a communications network, a data stream comprising the audio stream. The detection server decodes the audio stream into a pulse code modulated (PCM) stream. The detection server analyzes the PCM stream wherein analyzing includes accumulating, generating, comparing, grouping, adding, and determining. The detection server accumulates a predetermined length of the PCM stream into a buffer. The detection server then generates a plurality of time poorly ordered acoustic fingerprints from the predetermined length of the PCM stream accumulated in the buffer. Each acoustic fingerprint of the plurality of 2 poorly ordered acoustic fingerprints generator from the predetermined length of the PCM stream is compared to the acoustic fingerprints in the fingerprint database to produce matches. Matches are grouped by song identifier. The detection server as the song ended fire to a list of song candidates if the quantity of matches intergroup exceeds a predetermined threshold and the matched acoustic fingerprints are in the same temp oral order in the fingerprint database is in the plurality of temporally ordered acoustic fingerprints generated from the predetermined length of the PCM stream accumulated in the buffer. The detection server determines a song detection if the matched, temporally ordered acoustic fingerprints of the group of matches having the greatest quantity of matched acoustic fingerprints exceeds a time threshold.

BRIEF DESCRIPTION OF THE SEVERAL VIEWS OF THE DRAWINGS

FIG. 2 is a chart representative of one embodiment of a database of acoustic fingerprints for a plurality of songs.

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
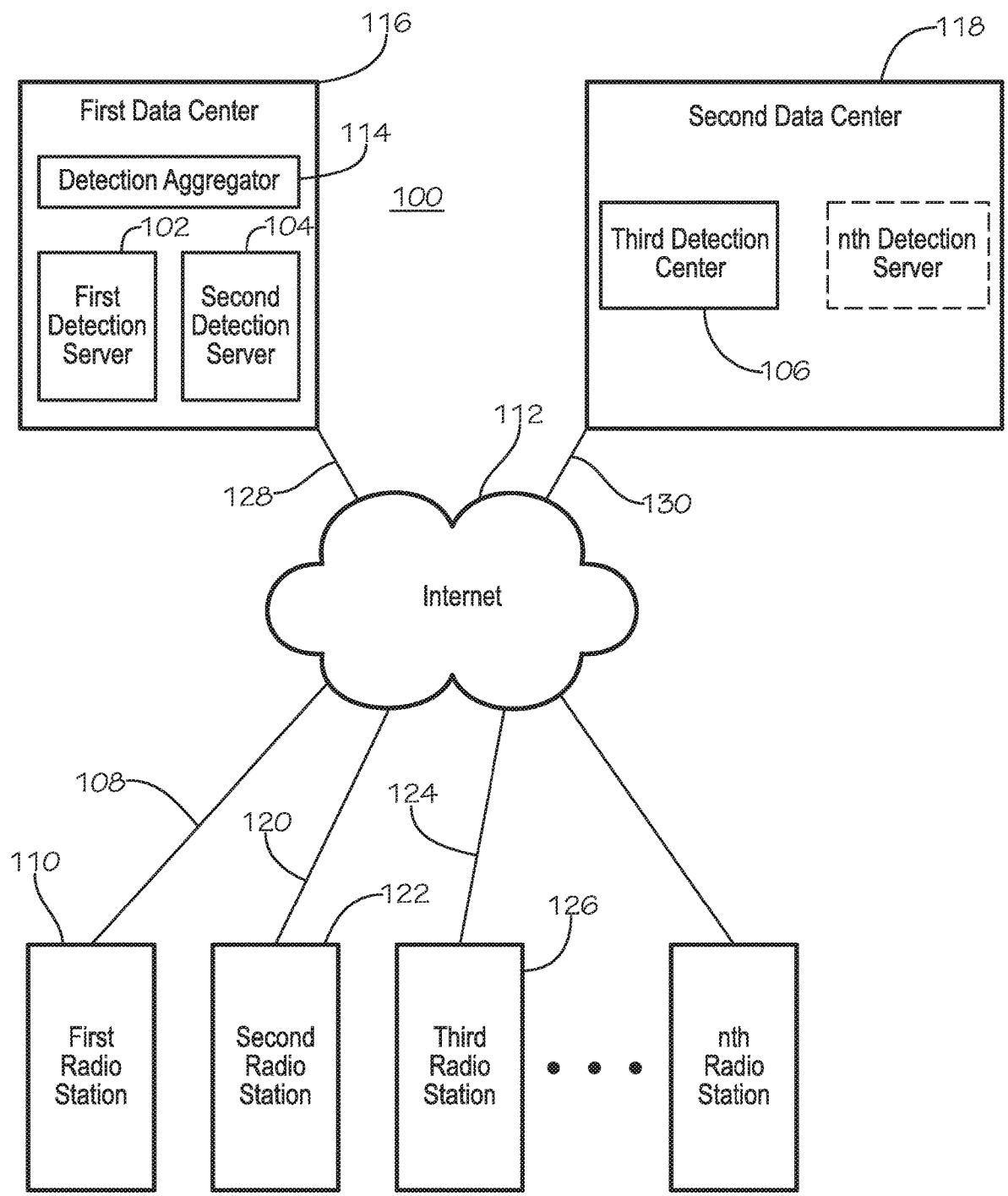
FIG. 1 is a block diagram of a system for detecting songs in a plurality of continuous audio streams.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

In one embodiment, a novel system monitors and detects airplay spins on terrestrial radio stations through their respective online streams. In one embodiment of this system, a library of all potential songs to be detected is run through an audio fingerprinting algorithm. Any fingerprinting algorithm may be used; however, a preferred algorithm is characterized by creation of multiple audio (i.e., acoustic) fingerprints which correspond to very small time slices of audio, on the order of approximately 1 fingerprint per two or fewer seconds of audio. These fingerprints are stored in a fingerprint database along with information pertaining to the ID of its corresponding song, as well as the relative temporal location of this fingerprint in the audio (FIG. 2). In one embodiment, the temporal location of the fingerprint is simply stored as an increasing integer value with each successive fingerprint, where the temporal value corresponding to the fingerprint of the first audio clip in a song is a 0, the second fingerprint is a 1, the third is a 2, and so on and so forth.

Figure 4:
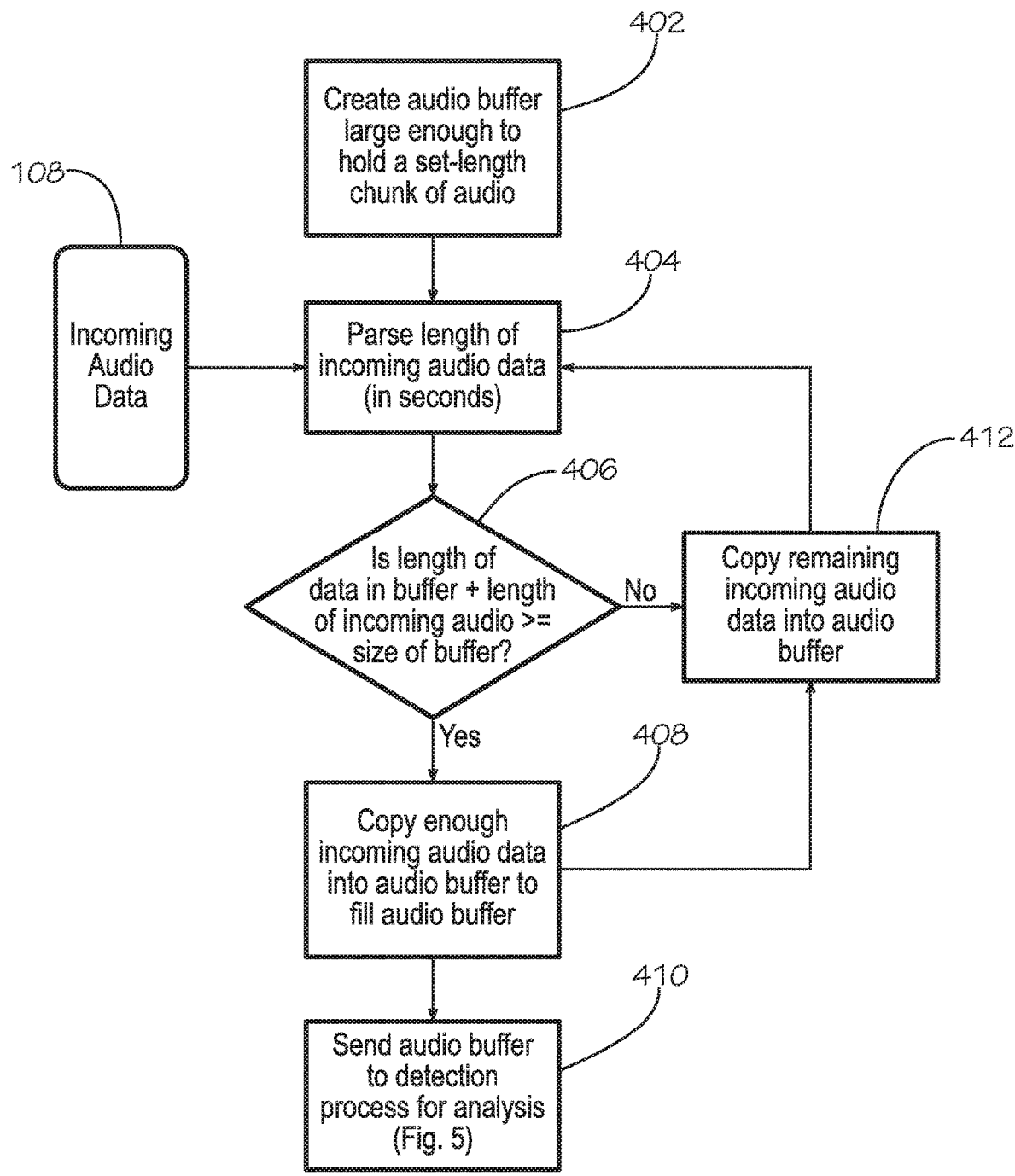
FIG. 4 is a flowchart of one embodiment of a process by which audio is monitored and divided into set-length (i.e., predetermined length) segments and analyzed to detect a song within the monitored audio.

For song detection, an Internet-based audio stream is continuously monitored in a network-enabled computer process, with the process collecting audio data until a predefined length of audio has accumulated and been stored. The length of this audio clip should be reasonably larger than the length of audio corresponding to one fingerprint. In one embodiment, this length of accumulated audio may be equal to 90 seconds. Once the specified length of audio has been stored, a separate computer process is spawned or a separate computing instance is utilized to process this audio clip while the original process continues to store the next specified length of audio. This process continues ad infinitum with one or more processes accumulating set-length segments of audio and additional processes analyzing them as soon as they are ready (FIG. 4).

Once a process has been created to analyze a set-length segment of audio, this process carries out the same audio fingerprinting algorithm on that audio clip that was initially used to fingerprint the original library of songs for insertion into the fingerprint database, but with time slices that overlap one another much more heavily than in the original fingerprint. The resulting set of audio fingerprints from the accumulated audio clip are then compared to the audio fingerprints in the fingerprint database, and the number of individual fingerprint matches that are found are used to determine whether the audio clip matches any of the songs in the database. For every song in the database for which some number of fingerprint matches over a pre-defined threshold value are returned, that song is added to a list of candidate songs for that audio clip.

In one embodiment, after the list of candidate songs has been created (or while the list of candidate songs is being created), the temporal qualities of the fingerprints are evaluated to ensure that they remain in the correct temporal order. In other words, for a set of fingerprint matches for which the fingerprints of the accumulated audio clip are in time-correct order, the resulting temporal values that were stored along with the original audio fingerprints corresponding to those matches should also be ordered in time-ascending order (i.e. temporal value '2' should come before temporal value '3' which should come before temporal value '7'). If a song candidate is identified for which the temporal ordering of the matching fingerprints does not correspond to natural time order, that song is removed from the list of candidates.

Figure 5:
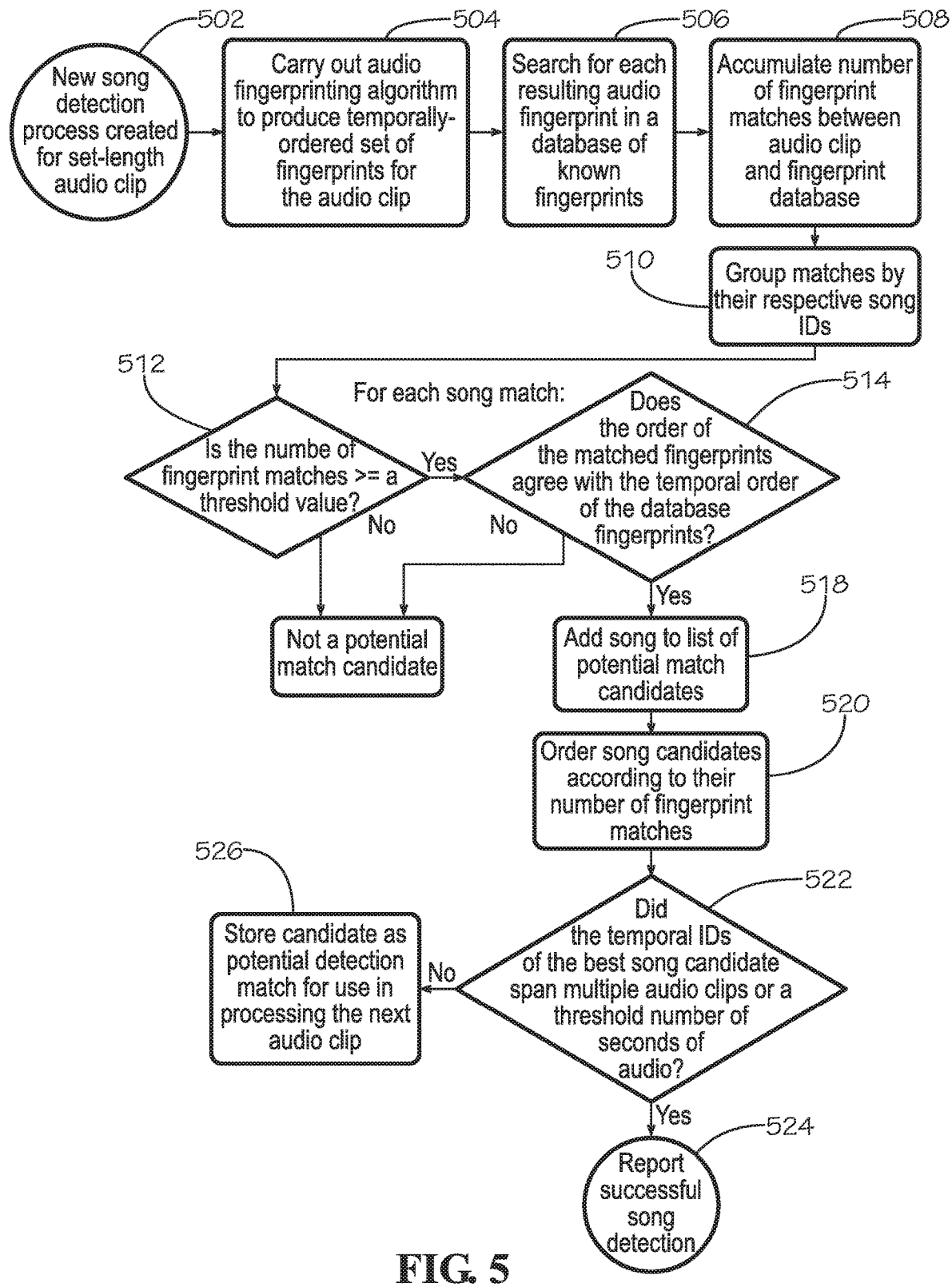
FIG. 5 is a flowchart of one embodiment of a song detection process from accumulation of one or more set-length (i.e., predetermined length) segments of audio (such as those produced by the process of FIG. 4) to detection and verification of a song from the one or more set-length segments of audio.

After all processing has been carried out, the song candidate with the highest number of temporally correct fingerprint matches is considered to be the best match. In one embodiment, this song candidate is assumed to be a positive detection. In another embodiment, this song candidate is simply stored as a possibility. After the next segment of audio has been processed, the best match from that segment is compared to the best match from the audio clip directly before it. If these two candidates match, a song detection has occurred, and this detection is either saved or reported back to another computer process handling song detections. FIG. 5 outlines this process in diagram form. Additionally, the detection process itself keeps a record of the song detection and the time it was detected.

Figure 3:
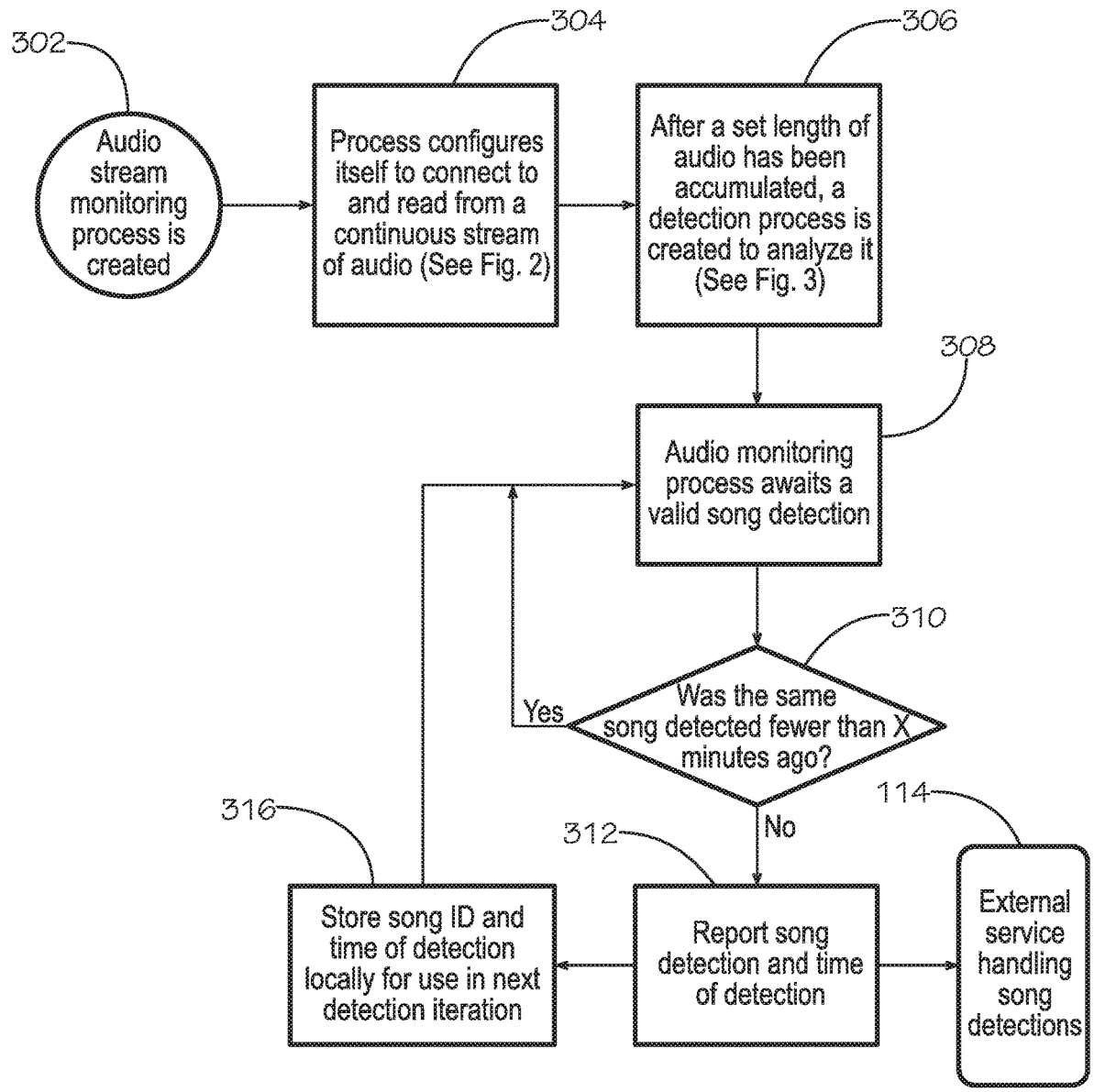
FIG. 3 is a flowchart of an overview of a process for detecting songs in a continuous stream of audio.

After the next segment of audio has been accumulated, this process repeats itself ad infinitum. In order to ensure that the same song is not detected multiple times during one song play, a detection is not stored or reported if there has been a detection for that same song within some predetermined number of seconds before the current detection. In one embodiment, this time limit may be six minutes or roughly twice the length of a standard radio song. In this case, a song will not be detected as a new or different song play if it has already been detected within 6 minutes of the current detection. FIG. 3 shows how the detection process keeps track of this information.

A single clip of audio data may not be allowed to contain detections for more than one song at a time. In other words, if a single segment of audio spans the time boundary between two songs, and enough temporally correct fingerprints were matched from each song to identify two viable song candidates after all processing has been carried out, then in one embodiment, all candidates from this audio clip are discarded. This constraint, coupled with the temporal ordering requirement of the fingerprint matches, the minimum threshold on the number of temporally correct fingerprint matches for a song detection to occur, and a requirement that at least two consistent detections occur in successive audio clips, allows for robust monitoring of continuous audio streams and ensures that only one song detection is registered per song play. Additionally, since the system is continuously monitoring the audio stream, there is a significantly larger amount of audio data over which to perform song detection analysis, thereby improving the detection robustness and accuracy of the system over that of existing solutions which must attempt to make a correct song identification from only one short clip of audio.

Referring to FIG. 1, a system 100 for detecting and identifying songs in a continuous audio stream includes a fingerprint database 200 (see FIG. 2) and a detection server 102. In one embodiment, the fingerprint database 200 is integral with the detection server 102. In one embodiment, the continuous audio stream is a broadcast stream 108 from a first radio station 110 provided to the public Internet 112. The detection server 102 To the first radio station 110 via the Internet 112 to receive the broadcast stream 108. When the detection server 102 detects song in the broadcast stream 108 (i.e., data stream or audio stream), the detection server 102 provides a song identifier, a data stream identifier, and a time stamp to a detection aggregator 114 of the system 100. The detection aggregator 114 associates the received song identifier, data stream identifier, and time stamp with one another and a detection database. The time stamp is the time that the song detection was determined by the detection server 102. The detection aggregator 114 thus aggregates a playlist of songs for the first radio station 110. As seen in FIG. 1, the detection server 102 may monitor the broadcast stream or data stream from multiple radio stations simultaneously such that the detection aggregator 114 builds a time stamped playlist of songs for each of the plurality of radio stations in the detection database. The detection aggregator 114 may then generate reports from the detection database such as the number of times a given song was played during a time period, or a ranking of which songs were played the most by one or all monitored radio stations.

In one embodiment, the system 100 includes a plurality of detection servers (i.e., second detection server 104 and third detection server 106) such that the detection server 102 is a first detection server 102. In one embodiment, the first detection server 102 and the second detection server 104 are located at a first data center 116. In one embodiment, each detection server has its own internal copy of the fingerprint database 200. Multiple detection servers may be used at one data center to prevent memory overruns in the machines were virtual machines operating in the data center. As shown in FIG. 1, the system 100 includes the third detection server 106 located at a second data center 118. The second data center 118 is separate and different from the first data center 116. In one embodiment, the first and second data centers 116, 118 may be located in different geographic regions and the detection servers operating in each data center monitor radio stations closest to each given data center, while all of the detection servers (i.e., the first detection server 102, the second detection server 104, and the third detection server 106) report song detections including a song identifier, a data stream identifier, and the time stamp to the detection aggregator 114 at the first data center 116. Each data center has a separate communications link to the public Internet 112 to receive the public broadcast streams (i.e., data stream or audio stream) from the radio stations and other data from other public sources. That is, the first data center 116 has a first communications link 128 to the public Internet 112 while the second data center 118 has a separate second communications link 130 to the public Internet 112. In one embodiment, the first detection server 102 monitors the broadcast stream 108 provided by the first radio station 110 and broadcast stream 120 provided by the second radio station 122 while the third detection server 106 monitors the broadcast stream 124 provided by the third radio station 126. The first detection server 102 and the third detection server 106 both report song detections to the detection aggregator 114 at the first data center 116. The radio station streams are split up in such a way as to avoid causing latency and bandwidth problems for other services and applications at the first data center 116 utilizing the first communications link 128 of the first data center 116. Similarly, splitting up the radio station streams avoids latency and bandwidth problems for other services and applications at the second data center 118 utilizing the second communications link 130. In one embodiment, the detection aggregator 114 is integral with the first detection server 102. In one embodiment, song detections are stored by each detection server and provided at predetermined intervals to the detection aggregator 114. In one embodiment, the detection aggregator 114 allocates radio stations (i.e., continuous data streams to be monitored for songs) to detection servers. The detection aggregator 114 may do this by, for example, setting a number of detection servers to be utilized as a function of the number of radio stations to be monitored and coordinating a handoff of a radio station from one detection server to another if the load balance between detection servers is off by more than 20%.

Referring to FIG. 2, the fingerprint database 200 includes a plurality of acoustic fingerprints generated from each of a plurality of songs. Each fingerprint is associated with a song identifier and a temporal identifier or temporal value. For example, a first fingerprint 202 of the fingerprint database 200 is associated with a song identifier having a value of 1123 and a temporal value of 0. The first fingerprint 202 is thus the first sample taken from a song corresponding to the song identifier 1123. Fingerprint database 200 may correlate the song identifiers to actual song titles and artists, or those correlations may be kept in the detection aggregator 114.

Referring to FIG. 3, the detection server 102 initiates monitoring of an audio stream at 302 by creating a process to monitor the audio stream. At 304, the detection server 102 accumulates segments (i.e., set length segments) of the monitored audio stream (see FIG. 4). At 306, the detection server 102 analyzes the accumulated segments of the monitored audio stream to determine song detections within the monitored audio stream. At 308, the detection server analyzes the accumulated audio stream segments until a song is detected. At 310, if the detection server 102 determines that a detected song has not been detected within a predetermined period of time, the detection server 102 at 312 reports the detected song together with a time stamp (i.e., time of detection) to an external service handling song detections (i.e., detection aggregator 114). The detection server 102 then stores the identified song for comparing to future song detections at 310. If at 310 the detection server 102 determines that a detected song has been previously detected within the predetermined period of time, the detection server 102 disregards the determined detection and does not report the detected song in time of detection at 312.

Referring to FIG. 4, the process of receiving the continuous audio stream (i.e. broadcast stream or data stream) at the detection server 102 begins at 402 with creating a buffer sized to hold a predetermined length of the audio stream. At 404, the detection server 102 receives via the communications network 1/12 the data stream including an audio stream. The detection server 102 decodes the audio stream into a pulse code modulated (PCM) stream. At 406, the detection server 102 determines whether the length of the PCM stream in the buffer together with a next packet of PCM stream data is greater than the size of the buffer. If the buffer size is exceeded, the detection server 102 fills the buffer at 408. The data representative of the stream in the buffer is saved to be analyzed for song detection at 410. At 412, any remaining data in the next packet of PCM stream that was not put in the buffer is used to begin refilling the buffer. It is contemplated that the process may use multiple buffers. In one embodiment, the detection server 102 operates a first process to accumulate the PCM stream into the buffer and generates a second process to analyze the PCM stream accumulated in the buffer in response to the buffer accumulating the predetermined length of the PCM stream in the buffer.

Referring to FIG. 5, at 502 the detection server 102 creates a new process to analyze the accumulated, predetermined length of PCM stream saved from the buffer. At 504, the detection server 102 generates a plurality of temporally ordered acoustic fingerprints from the predetermined length of the PCM stream accumulated in the buffer. At 506, the detection server 102 compares each acoustic fingerprint of the plurality of temporally ordered acoustic fingerprints generated from the predetermined length of the PCM stream accumulated in the buffer to the acoustic fingerprints in the fingerprint database to produce matches. At 508, the matches are accumulated. At 510, the detection server 102 groups matches by song identifiers. For each song identifier having at least one match, the detection server 102 determines whether the quantity of matches corresponding to the song identifier exceeds a predetermined threshold at 512 and whether the matched acoustic fingerprints are in the same temporal order in the finger print database 200 is in the plurality of temporally ordered acoustic fingerprints generated from the predetermined length of the PCM stream accumulated in the buffer at 514. If either of the tests at 512 or 514 are failed, the detection server 102 determines that the song identifier does not correspond to a potential song candidate at 516. If the tests at 512 and 514 are passed, the song identifier is added to a list of potential song candidates at 518, and the list is sorted at 522 determines the song identifier having the greatest number of matched, temporally ordered fingerprints in the predetermined length of the PCM stream. At 522, the detection server 102 determines a song detection if the match, temporally ordered acoustic fingerprints of the group of matches (i.e., song identifier corresponding to the most matches) having the greatest quantity of matched acoustic fingerprints exceeds a time threshold. If a song detection occurs, the detection server 102 reports a successful song detection to the detection aggregator 114 by reporting the song identifier, a data stream identifier, and a time stamp to the detection aggregator 114 at 524. If the quantity of temporally ordered matches in the group does not exceed the threshold, then the detection server 102 stores the song identifier corresponding to the group having the most temporally ordered matches as a previous song candidate for use in analysis of a subsequent segment of the PCM stream. That is, in one embodiment, PCM stream accumulated and analyzed previously is from a first buffer and a first list of song candidates, and the detection server 102 accumulates the predetermined length of the PCM audio stream into a second buffer wherein the accumulated PCM stream is adjacent (i.e., after) the PCM audio stream segment accumulated in the first buffer. Analysis to determine a song candidate having the largest quantity of temporally ordered matches proceeds as described above to determine a second song identifier in a second list of song candidates having the largest quantity of temporally ordered matches. At 522, if the second song identifier in the second list of song candidates is the same as the previous song candidate (i.e., the song identifier in the first list of song candidates having the largest quantity matches), then the detection server 102 determines a song detection. In this way, the detection server 102 continuously receives, decodes, and analyzes the data stream (i.e., the radio broadcast stream or the PCM stream) to determine multiple song detections within the data stream. In one embodiment, the detection server 102 disregard the determine song detection if the song corresponding to the determine song detection was previously determined to be detected within a predetermined period of time (e.g., 6 minutes).

It will be understood by those of skill in the art that navigating between user interface views is accomplished by selecting a tab or object in a current user interface view corresponding to another user interface view, and in response to selecting the tab or object, the user interface updates with said another user interface view corresponding to the selected tab or object.

It will be understood by those of skill in the art that providing data to the system or the user interface may be accomplished by clicking (via a mouse or touchpad) on a particular object or area of an object displayed by the user interface, or by touching the displayed object in the case of a touchscreen implementation.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful SYSTEMS AND METHODS FOR DETECTING AND IDENTIFYING SONGS IN A CONTINUOUS AUDIO STREAM it is not intended that such references be construed as limitations upon the scope of this invention except as set forth in the following claims.

What is claimed is:

1. A system for detecting and identifying songs in a continuous audio stream, said system comprising:
   a fingerprint database of acoustic fingerprints, wherein each fingerprint is associated with a temporal value and a song identifier such that the acoustic fingerprints corresponding to a song identifier can be temporally ordered by the temporal value associated with each acoustic fingerprint; and
   a detection server for detecting a song in a data stream, said detection server configured to:
      receive, via a communications network, a data stream comprising an audio stream; and
      decode the audio stream into a pulse code modulated (PCM) stream;
      analyze the PCM stream, wherein said analyzing comprises:
         accumulating a predetermined length of the PCM stream into a buffer;
         generating a plurality of temporally ordered acoustic fingerprints from the predetermined length of the PCM stream accumulated in the buffer;
         comparing each acoustic fingerprint of the plurality of temporally ordered acoustic fingerprints generated from the predetermined length of the PCM stream accumulated in the buffer to the acoustic fingerprints in the fingerprint database to produce matches;
         grouping matches by song identifier;
         adding the song identifier to a list of song candidates if the quantity of matches in a group exceeds a predetermined threshold and the matched acoustic fingerprints are in the same temporal order in the fingerprint database as in the plurality of temporally ordered acoustic fingerprints generated from the predetermined length of the PCM stream accumulated in the buffer; and
         determining a song detection if the matched, temporally ordered acoustic fingerprints of the group of matches having the greatest quantity of matched acoustic fingerprints exceeds a time threshold, wherein:
   the data stream is a data stream from a first radio station;
   the detection server is a first detection server located at a first data center;
   the system further comprises a second detection server located at a second data center different from the first data center;
   the system further comprises a detection aggregator configured to:
      receive a song identifier, data stream identifier, and a time stamp; and
      associate the received song identifier, data stream identifier, and time stamp with one another in a detection database, wherein:
         the first detection server and second detection server are each configured to provide the song identifier, data stream identifier, and the time stamp to the detection aggregator in response to determining the song detection;
         the time stamp is the time that the song detection was determined by the detection server, wherein the buffer is a first buffer and the list of song candidates is a first list of song candidates, and analyzing further comprises:
   accumulating the predetermined length of the PCM stream into a second buffer, wherein the predetermined length of the PCM stream accumulated is adjacent the predetermined length of the PCM stream accumulated in the first buffer;
   generating a plurality of temporally ordered acoustic fingerprints from the predetermined length of the PCM stream accumulated in the second buffer;
   comparing each acoustic fingerprint of the plurality of temporally ordered acoustic fingerprints generated from the predetermined length of the PCM stream accumulated in the second buffer to the acoustic fingerprints in the fingerprint database to produce matches;
   grouping, by song identifier, matches of the acoustic fingerprints of the plurality of temporally ordered acoustic fingerprints generated from the predetermined length of the PCM stream accumulated in the second buffer to the acoustic fingerprints in the fingerprint database;
   adding the song identifier to a second list of song candidates if the quantity of matches in a group exceeds a predetermined threshold and the matched acoustic fingerprints are in the same temporal order in the fingerprint database as in the plurality of temporally ordered acoustic fingerprints generated from the predetermined length of the PCM stream accumulated in the second buffer; and
   determining a song detection if the song identifier in the second list of song candidates having the largest quantity of matches is the same as the song identifier in the first list of song candidates having the largest quantity of matches.

2. The system of claim 1 wherein the fingerprint database and the detection server are integral.

3. The system of claim 1 further comprising a detection aggregator configured to:
   receive a song identifier, data stream identifier, and a time stamp; and
   associate the received song identifier, data stream identifier, and time stamp with one another in a detection database, wherein:
      the detection server provides the song identifier, data stream identifier, and the time stamp to the detection aggregator in response to determining the song detection; and
      the time stamp is the time that the song detection was determined by the detection server.

4. The system of claim 1, wherein each acoustic fingerprint corresponds to a duration of a song equal to or less than 2 seconds.

5. The system of claim 1, wherein the detection server continuously receives, decodes, and analyzes the data stream to determine multiple song detections within the data stream.

6. The system of claim 1, wherein the detection server operates a first process to accumulate the PCM stream into the buffer and generates a second process to analyze the PCM stream accumulated in the buffer in response to the buffer accumulating the predetermined length of the PCM stream in the buffer.

7. The system of claim 1, wherein the detection server disregards a determined song detection if the song corresponding to the determined song detection was previously determined to be detected within a predetermined period of time.

8. The system of claim 7, wherein the predetermined period of time is approximately 6 minutes.

9. A method of detecting and identifying songs in a continuous audio stream, said method comprising:
   storing a fingerprint database of acoustic fingerprints, wherein each fingerprint is associated with a temporal value and a song identifier such that the acoustic fingerprints corresponding to a song identifier can be temporally ordered by the temporal value associated with each acoustic fingerprint; and
   detecting, via a detection server, a song in a data stream, said detecting comprising:
      receiving, via a communications network, a data stream comprising the audio stream; and
      decoding the audio stream into a pulse code modulated (PCM) stream; and
      analyzing the PCM stream, wherein said analyzing comprises:
         accumulating a predetermined length of the PCM stream into a buffer;
         generating a plurality of temporally ordered acoustic fingerprints from the predetermined length of the PCM stream accumulated in the buffer;
         comparing each acoustic fingerprint of the plurality of temporally ordered acoustic fingerprints generated from the predetermined length of the PCM stream accumulated in the buffer to the acoustic fingerprints in the fingerprint database to produce matches;
         grouping matches by song identifier;
         adding the song identifier to a list of song candidates if the quantity of matches in a group exceeds a predetermined threshold and the matched acoustic fingerprints are in the same temporal order in the fingerprint database as in the plurality of temporally ordered acoustic fingerprints generated from the predetermined length of the PCM stream accumulated in the buffer; and
         determining a song detection when the matched, temporally ordered acoustic fingerprints of the group of matches having the greatest quantity of matched acoustic fingerprints exceeds a time threshold, wherein the detection server continuously receives, decodes, and analyzes the data stream to determine multiple song detections within the data stream; and
   disregarding, at the detection server, a determined song detection if the song corresponding to the determined song detection was previously determined to be detected within a predetermined period of time, wherein the buffer is a first buffer and the list of song candidates is a first list of song candidates, and analyzing further comprises:
   accumulating the predetermined length of the PCM stream into a second buffer, wherein the predetermined length of the PCM stream accumulated is adjacent the predetermined length of the PCM stream accumulated in the first buffer;
   generating a plurality of temporally ordered acoustic fingerprints from the predetermined length of the PCM stream accumulated in the second buffer;
   comparing each acoustic fingerprint of the plurality of temporally ordered acoustic fingerprints generated from the predetermined length of the PCM stream accumulated in the second buffer to the acoustic fingerprints in the fingerprint database to produce matches;
   grouping, by song identifier, matches of the acoustic fingerprints of the plurality of temporally ordered acoustic fingerprints generated from the predetermined length of the PCM stream accumulated in the second buffer to the acoustic fingerprints in the fingerprint database;
   adding the song identifier to a second list of song candidates if the quantity of matches in a group exceeds a predetermined threshold and the matched acoustic fingerprints are in the same temporal order in the fingerprint database as in the plurality of temporally ordered acoustic fingerprints generated from the predetermined length of the PCM stream accumulated in the second buffer; and
   determining a song detection if the song identifier in the second list of song candidates having the largest quantity of matches is the same as the song identifier in the first list of song candidates having the largest quantity of matches.

10. The method of claim 9 wherein the fingerprint database and the detection server are integral.

11. The method of claim 9 further comprising:
   receiving, at a detection aggregator, a song identifier, data stream identifier, and a time stamp; and
   associating the received song identifier, data stream identifier, and time stamp with one another in a detection database, wherein:
      the detection server provides the song identifier, data stream identifier, and the time stamp to the detection aggregator in response to determining the song detection; and
      the time stamp is the time that the song detection was determined by the detection server.

12. The method of claim 9, wherein each acoustic fingerprint corresponds to a duration of a song equal to or less than 2 seconds.

13. The method of claim 9, wherein the detection server operates a first process to accumulate the PCM stream into the buffer and generates a second process to analyze the PCM stream accumulated in the buffer in response to the buffer accumulating the predetermined length of the PCM stream in the buffer.

14. The method of claim 9, wherein:
   the data stream is a data stream from a first radio station;
   the detection server is a first detection server located at a first data center; and
   the method further comprises:
      receiving, at a detection aggregator, a song identifier, data stream identifier, and a time stamp; and
      associating the received song identifier, data stream identifier, and time stamp with one another in a detection database, wherein:
         the first detection server and a second detection server at a second data center different from the first data center of the first detection server are each configured to provide the song identifier, data stream identifier, and the time stamp to the detection aggregator in response to determining the song detection; and the time stamp is the time that the song detection was determined by the detection server.

15. The method of claim 9, wherein the predetermined period of time is approximately 6 minutes.

\* \* \* \* \*